United States Patent
Castelli et al.

(10) Patent No.: US 6,443,722 B1
(45) Date of Patent: Sep. 3, 2002

(54) ELECTRIC INJECTION ASSEMBLY FOR INJECTION PRESSES FOR PLASTIC MATERIALS

(75) Inventors: Romano Castelli, Rho; Maurilio Meschia, Usmate, both of (IT)

(73) Assignee: Negri Bossi S.p.A., Milan (IT)

( * ) Notice: Subject to any disclaimer, the term of this patent is extended or adjusted under 35 U.S.C. 154(b) by 166 days.

(21) Appl. No.: 09/633,872

(22) Filed: Aug. 7, 2000

(30) Foreign Application Priority Data

Sep. 7, 1999 (EP) .............................. 99830556

(51) Int. Cl.[7] .............................. B29C 45/50
(52) U.S. Cl. .................. 425/145; 425/558; 425/582; 425/583; 425/587
(58) Field of Search .................. 425/145, 208, 425/558, 582, 583, 587, 589

(56) References Cited

U.S. PATENT DOCUMENTS

| 4,601,653 A | * | 7/1986 | Inaba | ........................ 366/79 |
| 4,695,237 A | * | 9/1987 | Inaba | ........................ 264/40.7 |
| 5,143,736 A | | 9/1992 | Arai et al. | |
| 5,634,373 A | | 6/1997 | Cuffe et al. | |

FOREIGN PATENT DOCUMENTS

| EP | 0 549 790 A | 7/1993 |
| GB | 831 192 A | 3/1960 |

* cited by examiner

*Primary Examiner*—Jan H. Silbaugh
*Assistant Examiner*—Donald Heckenberg
(74) *Attorney, Agent, or Firm*—Nixon & Vanderhye, P.C.; Frank P. Presta

(57) ABSTRACT

An electric injection assembly for injection presses for plastic materials, comprising a plasticating screw (5) that performs a translational feed movement during injection of the plastic material into a mould cavity and a rotary movement around its own axis and a rotary translational movement of rotation around its own axis and retraction during the plasticating stage of the plastic material, the plasticating screw being connected to a drive screw (30) comprising two sections (30A, 30B) with threads having the helix in opposite directions, each of the sections (30A, 30B) engaging in respective screw nuts (31A, 31B) driven in rotation by respective electric motors (32A, 32B) through respective reduction units (33A, 33B).

5 Claims, 2 Drawing Sheets

ELECTRIC INJECTION ASSEMBLY FOR INJECTION PRESSES FOR PLASTIC MATERIALS

BACKGROUND OF THE INVENTION

The present invention relates to an injection assembly for injection presses for plastic materials.

According to the prior art, in the injection moulding procedure injection presses or moulding devices are used in which resins, consisting of plastic materials, are heated in order to be brought to a molten state in a heating cylinder and are injected, at high pressure, into a mould cavity so as to fill the mould. The resin in the molten state is cooled inside the mould so as to harden and form the moulded product. At this point the mould is opened and the moulded product is removed and can be sent for storage or to subsequent manufacturing stages.

The injection moulding device comprises a moulding assembly and an injection assembly. The moulding assembly generally comprises two half-moulds mounted on a fixed plate and a moveable plate, respectively, so that the mould can be opened and closed by moving the moveable plate backwards and forwards.

FIG. 1 diagrammatically shows an injection assembly according to the prior art, denoted as a whole with reference numeral 100. The injection assembly 100 comprises a heating cylinder 2 to bring the resins fed through a hopper 3 to the molten state, and an injection nozzle 4 to inject the molten material into the mould cavity. Inside the heating cylinder 2 there is a plasticating screw 5 that makes a rotary movement around its own axis to plasticate the resins and a translational movement forward for injection of the molten material and backward to allow the resins to be introduced from the hopper 3.

The plasticating screw 5 is driven by means of a system of electric motors.

A screw and nut screw system is provided for the translational movement of the plasticating screw 5 wherein a screw 6 engages in a nut screw 7. The nut screw 7 is driven by a motor 8 by means of a reduction unit 9 secured to the frame 10 of the machine. The screw 6 is prevented from making a rotary movement around its own axis by means of an anti-rotation device. Said anti-rotation device comprises a rod 11 secured to the screw 6 and a stop block 12 secured to the frame 10 of the machine. In this manner the rod 11, by abutting against the stop block 12, prevents rotation of the screw 6, allowing only translation. Accordingly, operating the electric motor 8 in one direction or in the opposite direction permits feed or retraction of the screw 6 which pulls with it the plasticating screw 5.

The rotary movement of the plasticating screw 5 is obtained by means of a splined shaft 13, connected by means of a joint or coupling 20 to the plasticating screw 5. The splined shaft 13 engages inside a sliding bush or sleeve 14 which is rotated by an electric motor 15 by means of a reduction unit 16 secured to the frame 10 of the machine. The splined shaft 13 is uncoupled from the screw 6 by means of a bearing assembly 17, so that the of rotary movement of the plasticating screw 5 can be independent from the translational movement.

The electric motors 8 and 15 are equipped respectively with encoder type sensors 18 and 19 to carry out the speed adjustments required in the various stages of the work cycle.

The injection assembly 100, according to the above described prior art, has a drawback due to the fact that each electric motor 8 or 15 is dedicated to the translation stage or to the rotation stage of the plasticating screw 5. Therefore the power to be installed for each motor is equal to the maximum power required for the stage with which it is associated. Consequently, during the translation stage of the plasticating screw 5 overloading of the motor 8 will occur, while the motor 15 remains idle, whereas during the rotation stage of the plasticating screw 5, overloading of the motor 15 will occur, while the motor 8 remains idle. This leads to an excessive waste of energy and rapid wear on the motors which practically always work at maximum power.

BRIEF SUMMARY OF THE INVENTION

The object of the invention is to eliminate these drawbacks by providing an electric injection assembly for injection presses for plastic materials that is practical, economical, versatile and easy to make.

In order to drive the plasticating screw, the electric injection assembly for injection presses for plastic materials according to the invention provides a single drive screw with two sections having threads with the helix in opposite directions. On each section of the drive screw operates a screw nut driven by a respective motor. The drive screw is connected to the plasticating screw by means of a coupling or joint. By suitably combining the speed of the two motors it is possible to carry out all the required stages of operation of the plasticating screw, that is to say rotation around its own axis, translation (feed and retraction), and rotary translation.

This system has various advantages with respect to systems of the prior art. In fact, in the injection assembly according to the invention it is possible, for any movement of the plasticating screw, to use all the power available from the two electric motors of the injection assembly, without using mechanical systems such as clutches, couplings or free-wheels.

Having identified the maximum power required for the various movements of the plasticating screw, the dimensions of each motor of the plasticating assembly will be such as to provide half of said maximum required power.

This system proves particularly simple and makes it possible to pass from one movement of the plasticating screw to another without a break, simply by changing the speed of the two motors.

Another advantage of the plasticating assembly according to the invention lies in the fact that the axial load operating on the screw during injection is divided between two nut screws instead of a single nut screw, as in the injection assemblies of the prior art, thus making the movement of the plasticating screw much more stable and balanced.

BRIEF DESCRIPTION OF THE SEVERAL VIEWS OF THE DRAWINGS

Further characteristics of the invention will be made clearer by the detailed description that follows, referring to a purely exemplary and therefore non limiting embodiment thereof, illustrated in the appended drawings, in which.

DETAILED DESCRIPTION OF THE INVENTION

Figure 1:
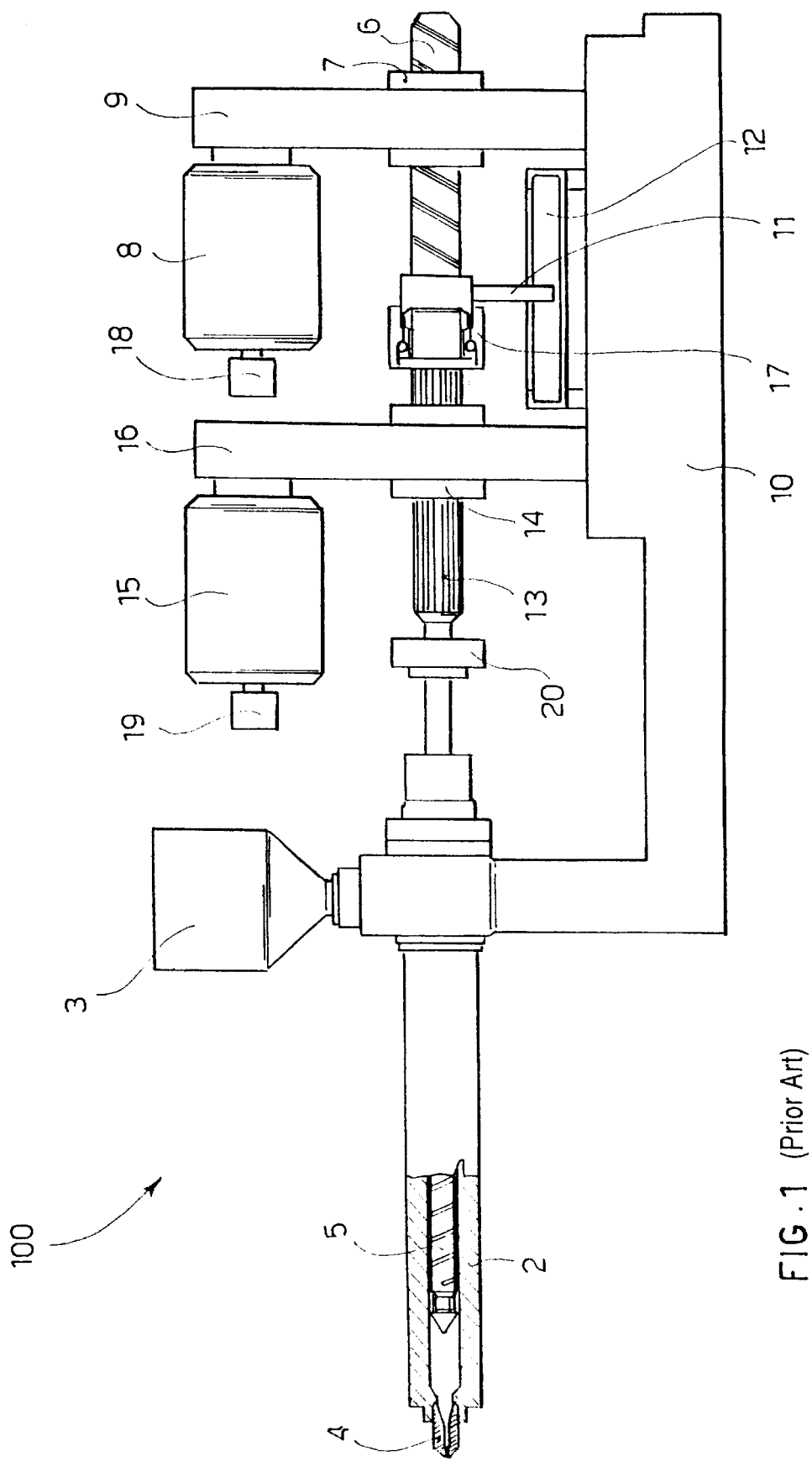
FIG. 1 is a diagrammatic elevational view of an injection assembly according to the prior art.
Figure 2:
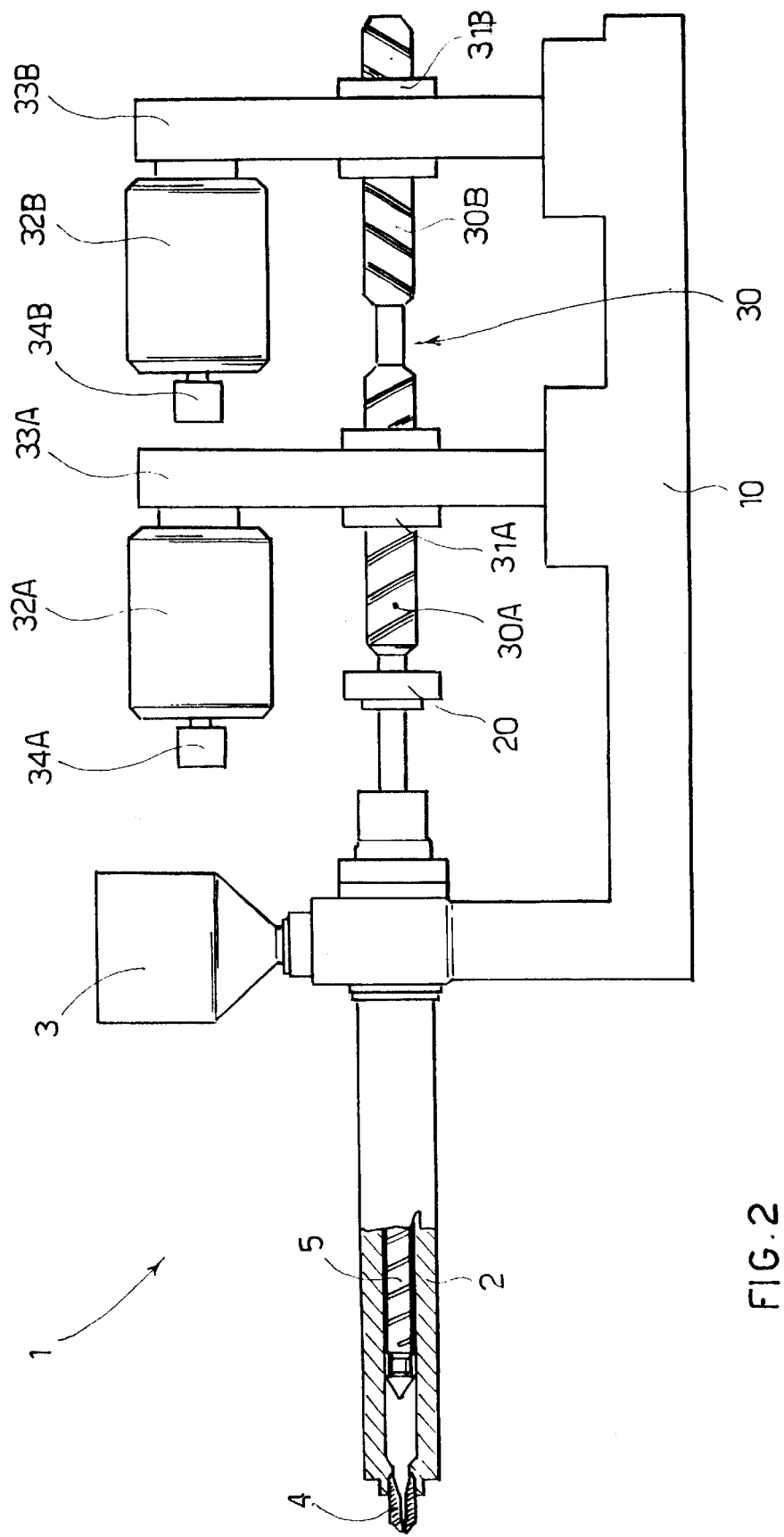
FIG. 2 is a diagrammatic elevational view of an injection assembly according to the invention.

FIG. 2 diagrammatically shows an injection assembly according to the invention, denoted as a whole with reference numeral 1. Elements that are the same as or equivalent to those illustrated in FIG. 1, relating to the plasticating assembly 100 according to the prior art, are denoted with the same reference numerals.

In the plasticating assembly 1 according to the invention, the plasticating screw 5 is connected by means of the coupling 20 to a drive screw 30. The drive screw 30 comprises two sections 30A and 30B with threads having the helix in opposite directions. Each section 30A and 30B of the drive screw 30 engages in a respective nut screw 31A, 31B driven by a respective electric motor 32A, 32B by means of a respective reduction unit 33A, 33B supported by the frame 10 of the machine.

The drive screw 30 can be of various types; ball bearing screws or planetary roller screws or simple sliding screws can be used.

In order to provide speed regulation, each motor 32A and 32B is controlled in speed and in torque by means of respective encoders or sensors 34A, 34B.

By suitably combining the speed of the two motors 32A and 32B it is possible to carry out all the required stages of operation of the plasticating screw 5.

In the injection stage the plasticating screw 5 must carry out a pure translation movement. Regulation of the translation speed of the plasticating screw 5 during the injection stage is equivalent to regulation of the speed of motors 32A and 32B. To effect the translation movement of the plasticating screw 5 it is necessary to control the two motors 32A and 32B to give the same speed of rotation, but with an opposite direction of rotation, since the drive screw 30 has threads 30A and 30B with opposite starts for the two screw nuts 31A and 31B.

During the injection stage, besides regulating the speed of translation of the plasticating screw 5, a load equalizing operation will have to be performed in order to load the two motors 32A and 32B in a balanced fashion, preventing one of them from being excessively loaded and its combined drive reaching the current limit. To equalize the loads, the joint speed of each motor is modified so that the motor with less load is speeded up and the motor with more load is slowed down. To identify the load on the motors it is sufficient to measure the torque current on each motor.

In the plasticating stage, the plasticating screw 5 must perform a movement of rotation around its own axis. In this stage the screw must be able to translate simultaneously, retracting as the plastic material is accumulated at the end of the plasticating screw 5. The plasticating screw 5, as it retracts, must ensure a constant but adjustable pressure on the plastic material in order to compact the plastic material.

In order to achieve a movement of pure rotation of the plasticating screw 5 the two motors 32A and 32B must be controlled so that they rotate at the same speed and both in the same direction. To achieve a movement of rotation and translation of the plasticating screw 5, on the other hand, the motors 32A and 32B must be controlled so that they rotate at different speeds.

By way of example, relations expressing the speeds of rotation and translation of the plasticating screw 5 according to the speeds of rotation of the motors 32A and 32B are described below, in which:

$W_A$=speed of rotation of the motor 32A (rad/sec)
$W_B$=speed of rotation of the motor 32B (rad/sec)
p=pitch of the drive screw 30 (mm)
t=velocity ratio of the reduction units 33A and 33B
$W_{screw}$=speed of rotation of the plasticating screw 5 (rad/sec)
$V_{screw}$=speed of translation of the plasticating screw 5 (mm/sec)

Assuming a positive sign for the speed of the motors for a certain direction of rotation (for example in a clockwise direction), the following equations are obtained:

$$W_{screw} = \frac{(W_A + W_B)}{2*t} \text{ (rad/sec)} \qquad (1)$$

$$V_{screw} = \frac{(W_A + W_B)*p}{2*t} \text{ (mm/sec)} \qquad (2)$$

Applying the equations (1) and (2), as particular cases we have:
with $W_A = W_B$ $W_{screw} = W_A/t$ $V_{screw} = 0$ The movement of the plasticating screw 5 is a pure rotation without translation.
With $W_A = -W_B$ $W_{screw} = 0$ $V_{screw} W_A * p/t$ The movement of the plasticating screw 5 is a translation without rotation.

In the plasticating stage, the plasticating screw makes a rotation superimposed on a translation, since it retracts as the plastic material is formed.

Using $W_m$ to indicate the average speed of rotation of the two motors 32A and 32B, we will have:

$$W_m = (W_A + W_B)/2 \qquad (3)$$

Using $\Delta W$ to indicate the average speed differential between the two motors 32A and 32B, we will have:

$$\Delta W = (W_A - W_B)/2 \qquad (4)$$

Accordingly, substituting the values of expressions (3) and (4) in expressions (1) and (2), the speed of rotation of the two motors 32A and 32B and the speed of translation and of rotation of the plasticating screw 5 can be expressed according to the average speed of rotation and the differential speed of rotation of the two motors:

$W_A = W_m + \Delta W$ $W_B = W_m - \Delta W$ $V_{screw} = \Delta W * p/t$ $W_{screw} = W_m/t$ The differential speed $\Delta W$ will be varied by the adjustment system so as to ensure the desired value of the load to be exerted on the plasticating screw 5 in order to compact the plastic material during rotation of the screw.

In an alternative solution to that proposed in the above embodiment, the reduction units 33A and 33B are not used and the motors 32A and 32B are therefore connected directly to the respective nut screws 31A and 31B. In this case the term t, which defines the reduction ratio of the reduction units 33A and 33B, will obviously disappear in the expressions set out above.

However, modifications or changes within the reach of an expert in the field can be made to the plasticating assembly I according to the invention, without thereby departing from the scope of the invention expressed in the appended claims.

What is claimed is:

1. An electric injection assembly for injection presses for plastic material, comprising a plasticating screw (5) that performs a translational feed movement during injection of plastic material into a mould cavity and a rotary movement around its own axis and a rotary translational movement of rotation around its own axis and retraction during plasticating stage of the plastic material and two electric motors (32A, 32B) acting on drive means able to impart said translational, rotary and rotary translational movements to the plasticating screw (5), characterized in that the said drive means for the plasticating screw is a drive screw (30) comprising two sections (30A, 30B) with threads having a helix in opposite directions, each of said sections engaging in respective screw nuts (31A, 31B) driven in rotation by means of said electric motors (32A, 32B).

2. An injection assembly according to claim 1, characterized in that said drive screw (30) is a ball bearing screw, or a planetary roller screw or a sliding screw.

3. An injection assembly according to claim 1, characterized in that said nut screws (31A, 31B) are driven in rotation by means of respective reduction units (33A, 33B), in turn driven respectively by said electric motors (32A, 32B).

4. An injection assembly according to claim 1, characterized in that said electric motors (32A, 32B) are controlled in speed and torque by respective sensors or encoders (34A, 34B).

5. An injection assembly according to claim 1, characterized in that said drive screw (30) is connected to said plasticating screw (5) by means of a joint or coupling (20).

* * * * *